United States Patent [19]

da Silva

[11] 4,432,090

[45] Feb. 14, 1984

[54] AUTOMATIC ERROR CORRECTION SYSTEM FOR TELEPRINTER TRAFFIC WITH BUNCHED REPETITION

[75] Inventor: Herman da Silva, Voorburg, Netherlands

[73] Assignee: Staat der Nederlanden (Staatsbedrijf der Posterijen, Telegraphie en Telefonie), The Hague, Netherlands

[21] Appl. No.: 273,501

[22] Filed: Jun. 15, 1981

[30] Foreign Application Priority Data

Jun. 23, 1980 [NL] Netherlands .................. 8003622

[51] Int. Cl.³ ................ G06F 11/00; G08C 25/00
[52] U.S. Cl. .................... 371/32; 178/2 R; 178/4; 178/23 A
[58] Field of Search ............ 371/32, 20, 22, 30, 371/72; 178/1, 2 R, 4, 3, 4.1 R, 4.1 A, 4.1 B, 23 A

[56] References Cited

U.S. PATENT DOCUMENTS

| | | | |
|---|---|---|---|
| 3,641,494 | 2/1972 | Perrault et al. | 371/32 |
| 3,701,841 | 10/1982 | Brunialti et al. | 178/4.1 B |
| 3,790,699 | 2/1974 | da Silva | 371/32 |
| 3,879,577 | 4/1975 | Progler | 371/32 |
| 3,979,719 | 9/1976 | Tooley et al. | 371/32 |
| 4,144,522 | 3/1979 | Kageyama et al. | 371/32 |
| 4,149,142 | 4/1979 | Kageyama et al. | 371/32 |
| 4,304,001 | 12/1981 | Cope | 371/32 |
| 4,377,862 | 3/1983 | Koford et al. | 371/32 |
| 4,380,009 | 4/1983 | Long et al. | 178/4.1 R |

OTHER PUBLICATIONS

*Western Union Technical Review*, "Automatic Telegraph Switching System Plan 55-A," Western Union Telegraph Co., 1958.

*Primary Examiner*—Jerry Smith
*Assistant Examiner*—Gary V. Harkcom
*Attorney, Agent, or Firm*—Hugh Adam Kirk

[57] ABSTRACT

The disclosure concerns a communication system for line printers, such as teleprinter equipment, via high-quality radio communications. The repetition of the signals received mutilated takes place per line of signals at the end of a number of lines. The transmitter for the system comprises a counter from which the line number is fed to the transmitter during the line printer return or the line feed period up to the end of the page or the message. The receiver detects which lines have been received mutilated and registers their line numbers. Then the request for repetition of the numbered mutilated lines is made at the end of each message and at the end of each page of the message, if the message is longer than a page, for example, 32 lines.

4 Claims, 4 Drawing Figures

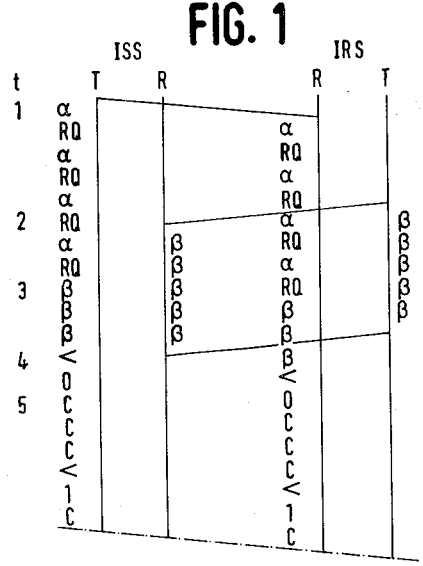
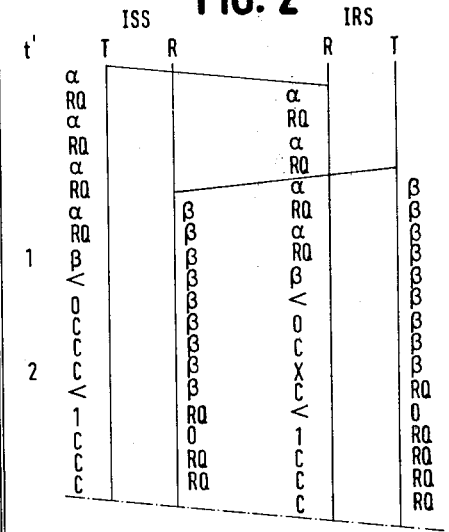
FIG. 1
FIG. 2
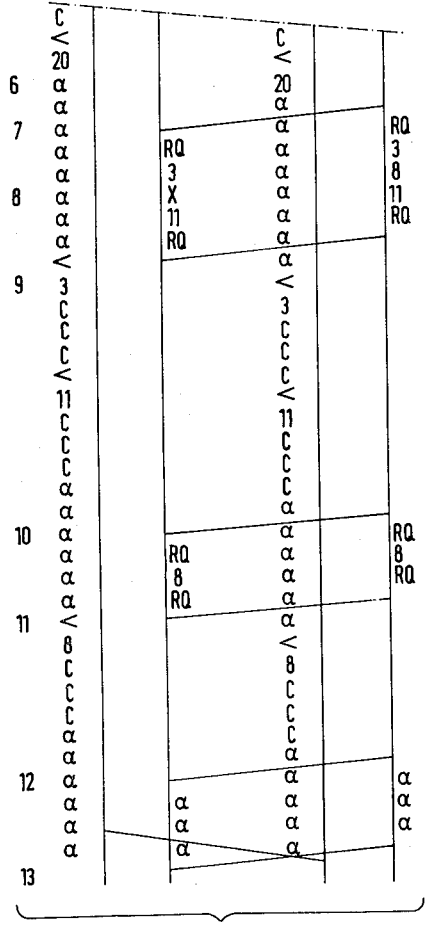
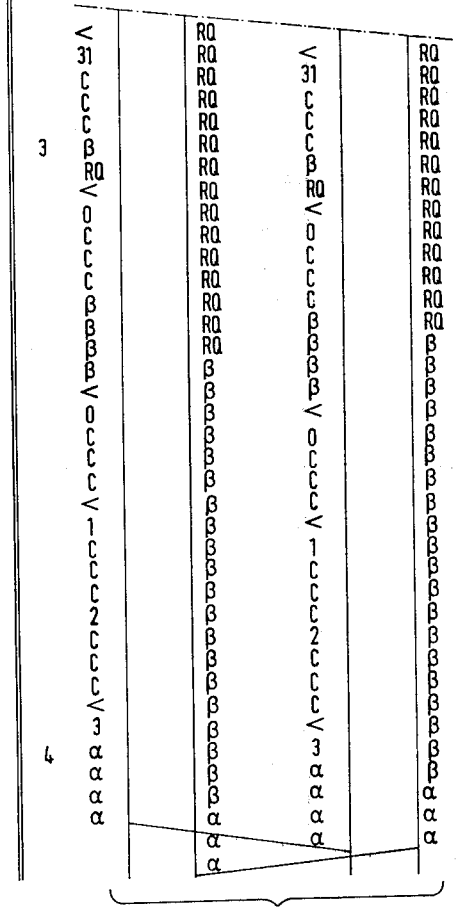
SIMPLEX SYSTEM
DUPLEX SYSTEM

RECEIVER

AUTOMATIC ERROR CORRECTION SYSTEM FOR TELEPRINTER TRAFFIC WITH BUNCHED REPETITION

BACKGROUND OF THE INVENTION

The invention relates to a system for teleprinter traffic, in which an information sending station, comprising a transmitter-receiver, transmits information to an information receiving station, comprising a transmitter-receiver, and in which the information receiving station can transmit signals to the information sending station for the repeated transmission of signal parts received mutilated by the information receiving station.

Systems of this sort are generally known and are usually defined as systems according to the ARQ-system (Automatic Error Correcting System). The working of these systems is particularly described in Recommendation 476 of the "Comité Consultatif International des Radio-communications" (CCIR).

A drawback of the known system is that its efficiency is low because of the frequent switching for transmitting and receiving and the long waits occurring when executing the repetition procedure. This drawback is felt all the more in the case of a long propagation time caused by a great distance between the information sending station and the information receiving station.

Though the known system was originally used in VHF (very high frequency) circuits mainly, it is now more and more used in the VHF-UHF (ultra high frequency) frequency band. The wide-band frequency channels used in this band allow a quick signal transmission, so that propagation delays begin to play a much more important part.

OBJECTS AND ADVANTAGES

The object underlying the invention is to provide a system with a considerably higher efficiency than the systems known so far by making propagation delay less important and by doing the repetitions all at one time. It has already been suggested to enhance the efficiency of the ARQ-systems as described for example in the U.S. Pat. No. 3,878,333 issued Apr. 15, 1975 to Shimizu et al. Former suggestions often had the drawback that they led to the use of an equipment far more complicated than the equipment needed for the known system.

Hence another object of the invention is to provide an efficiency enhancing system ensuring the simplicity of the equipment required. The system according to the invention is based on the insight that when using telecommunication channels which are less subject to disturbances, the ratio of the actual time needed for the transmission of information to the time required for the ARQ-procedure can be improved considerably.

SUMMARY OF THE INVENTION

These and other objects are now realized because of the fact that the information sending station transmits a line number prior to each information line, and that in the case of an unmutilated reception the information receiving station sends back an acknowledgment signal at least within a fixed number of lines, or in the case of a mutilated reception it sends back an RQ-signal (request for repetition signal) followed by the numbers of the lines received mutilated. In consequence of this, the invention provides a system with a considerably better ratio of the effective transmission time to the time needed for error correction. It is true that on the side of the information sending station a greater number of store locations is required than with the known systems, but this can hardly be felt to be a drawback, because usually some information is collected before the transmission is started, so that the necessary storage capacity is already present.

BRIEF DESCRIPTION OF THE VIEWS

The above mentioned and other features, objects and advantages, and manners of attaining them are described more specifically below by reference to embodiments of this invention shown in the accompanying drawings, wherein:

FIG. 1 is a time diagram of the working of a preferred embodiment;

FIG. 2 is a time diagram of the working of a second possible embodiment;

DETAILED DESCRIPTION OF PREFERRED EMBODIMENTS

Figure 3:
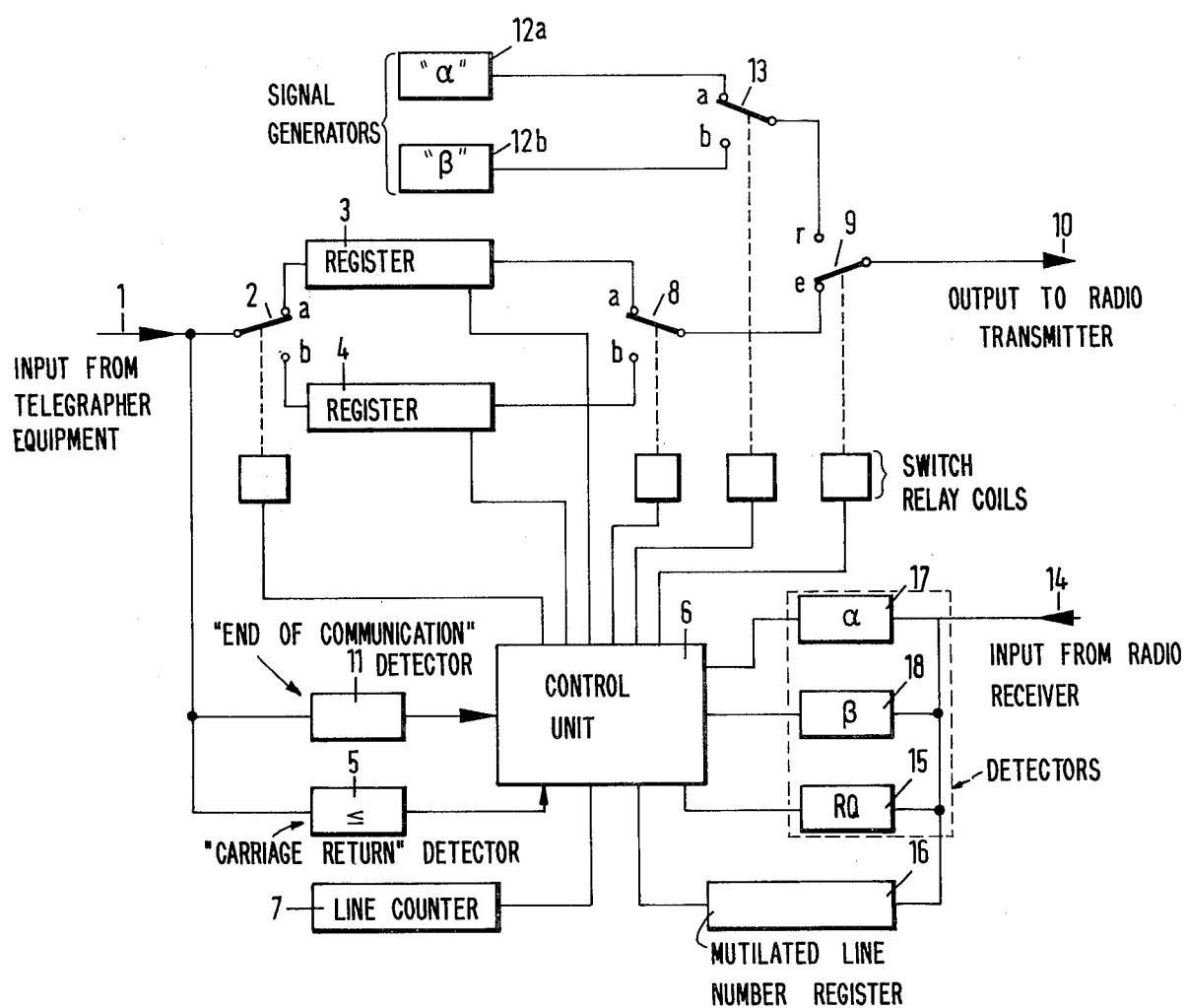
FIG. 3 represents a block wiring diagram of an embodiment of a transmitter for signals.

Definitions and expressions as known from the CCIR-recommendation 476 with regard to the mode A will be used every now and then in what follows.

FUNCTION OF FIRST EMBODIMENT

FIG. 1 shows a time diagram in which the signals transmitted by an information sending station are plotted along the line ISS-T and in which the signals received by said station are plotted along the line ISS-R. The signals transmitted by an information receiving station are plotted along the line IRS-T and the signals received by this station are plotted along the line IRS-R.

The information sending station ISS calls by alternately transmitting the signals $\alpha$ and RQ ($t_1$), which may be interchanged with the call number of the information receiving station IRS. As soon as IRS receives said signals and has come into phase in the known way, it will send back the $\beta$-signal several times ($t_2$). As soon as ISS receives the $\beta$-signal, this signal will be transmitted three times ($t_3$) after the first RQ-signal. After this station ISS transmits the signal "carriage return" or "line feed" <($t_4$), which, according to the invention, is immediately followed by the number of the first line 0. After this follows the information content of the first line, here represented by CCC ($t_5$). At the end of the first line the < signal and the line number 1 of the next line will be transmitted and the information will follow again. Should the information consist of e.g. 20 lines, the signal <20 will be transmitted, followed by $\alpha$-signals ($t_6$) indicating the last line of the message (in that line 20 has number 19!).

As soon as station IRS receives $\alpha$-signals, it will answer according to the invention with the signal RQ (request for repetition) followed by the numbers of the lines ($t_7$) which have been received mutilated, namely lines 3, 8 and 11. Station IRS checks the unmutilated reception by means of for example the constant ratio check in the known way. In the example according to FIG. 1 station IRS has received the lines numbered 3, 8 and 11 mutilated and requests for their repetition. For this purpose station IRS transmits the signals RQ, 3, 8, 11, RQ.

Station ISS receives the signal 8 mutilated (which is represented by x ($t_8$)), and therefor only sends back ($t_9$) the signals < and 3 followed by the information content of line 3, (C, C, C), followed by the signals < and 11 and the information content of line 11. The information is terminated by α-signals.

On receipt of the α-signals, indicating end of lines repeated that the receiver correctly received, station IRS transmits the signals RQ, 8 and RQ ($t_{10}$), after which the information content of line 8 ($t_{11}$), preceded by the signals < and 8, and followed by a series of α-signals is transmitted by station ISS. Next station IRS sends back ($t_{12}$) three α-signals, after which station ISS breaks the connecion ($t_{13}$).

An advantage of the system according to the invention is that the information receiving station IRS, after having come into phase, can remain passive until the end of the information. Should station IRS lose phase, the phase will be restored in the known way (CCIR-recommendation 476.1). The lines are numbered from 0 to 31, for the signals transmitted consist of a five-unit code, transformed according to the CCIR-recommendation and allowing only 32 variants. It is true that higher line numbers can be used by indicating the line number by more than one signal, but the advantage of the use of one signal is that it can be processed during the carriage-return or the line-feed period. More than one signal may lead to an unnecessary delay. This means that the repetition of the lines received mutilated by station IRS has to take place after at most 32 lines. In consequence of this the store in the transmitter of station ISS can be limited. In case the information comprises more than 32 lines, station ISS transmits the β-signal instead of the α-signal after the 32nd line and after the repeated lines, so that station IRS knows that the information is continued after the repetition. If all the lines have been received unmutilated, station IRS gives the acknowledgment signal by sending back the same signal as has been received: the β-signal each time after 32 lines or the α-signal at the end of the information.

FUNCTION OF A SECOND EMBODIMENT

FIG. 2 shows a variant for the method according to FIG. 1. With this variant the information receiving station IRS transmits without interruption, so that the receiver R of the information sending station ISS remains in phase with the transmitter T of station IRS. In consequence of this the phase relation between the transmitter T and the receiver R in station IRS can remain constant, whereas the phase relation between the transmitter T and the receiver R of station ISS can vary with the changes in the propagation time.

The call begins in the same way as with FIG. 1. After station ISS has received the β-signal once, one β-signal is sent back ($t_1'$) after the next RQ-signal to indicate that the phasing has finished and that the transmission of information will be started. Station IRS continues to transmit the β-signal without interruption. As soon as on line 0 the second signal C is received mutilated by station IRS (indicated by x) ($t_2'$), station IRS will transmit the RQ-signal once, followed by line number 0 once, after which RQ signal is transmitted without interruption to indicate that repetition is requested. At the end of line number 31 station ISS transmits the β-signal ($t_3'$) followed by the signals RQ, <, line number 0 and the information content of line 0, followed by the β-signals to indicate that the information is not yet at an end. As soon as station IRS has received line 0 unmutilated, the β-signal will be transmitted in acknowledgment. The last lines of the information, which after number 31 are numbered 0, 1, 2—again, are received unmutilated. Station ISS terminates the information by α-signals ($t_4'$) until α-signals are received back from station IRS, after which the connection can be broken.

TRANSMITTER CIRCUITRY FOR FIRST EMBODIMENT

FIG. 3 shows a possible embodiment of that part of the transmitting device to which the invention relates. The working of the device according to the diagram represented by FIG. 3 will be described in what follows with reference to the time diagram of FIG. 1.

The teleprinter signal supplied is fed to one of the registers 3, 4 via an input 1 and a switch 2. Whenever the "carriage return"-signal is found at the input 1, it will be detected by a detector 5, after which a control unit 6 will increase the state of the counter 7 by 1. Besides the control unit 6 indicates in the register 3 or 4, in which the information of the line to be received is stored, the line with the number corresponding to the state of the counter. Moreover the information in each line of the registers 3 and 4 comprises the "carriage return"-signal. At the same time the information stored in the register 3 is fed to an output 10 via a switch 8 and a switch 9. The output 10 is connected to a radio transmitter. When the information is terminated, a detector 11 detects the "end of communication"-signal (00000), after which the control circuit 6 puts the switch 9 in the r-contact position, so that the α-signal will be transmitted by an α-generator 12a.

In case the information received via the input 1 is longer than 32 lines, the control circuit 6 puts the switch 2 and a switch 13 in the b-state, after the counter 7 has reached the contact position 31. Besides the switch 9 is put in the r-contact position. Because the reading speed of the registers is many times higher than the recording speed, the lines received mutilated can now be repeated first. The signal from the receiver is led in at an input 14, after which an RQ-detector 15 detects the RQ-signals, so that the numbers of the lines received mutilated can be stored in a register 16 under the control of the control circuit 6, which now indicates one by one the lines in the register 3 which have to be repeated. As soon as acknowledgment is received from the IRS-station, this will be reported by an α-signal detector 17 or by a β-signal detector 18 to the control circuit 6, which now puts the switch 8 in the b-contact position, so that the information already stored in the register 4 can be led to the output 10. At the same time the control circuit 6 clears the register 3.

When the information is longer than 64 lines, the change-over from register 4 to register 3 takes place in the same way.

RECEIVER CIRCUITRY FOR FIRST EMBODIMENT

Figure 4:
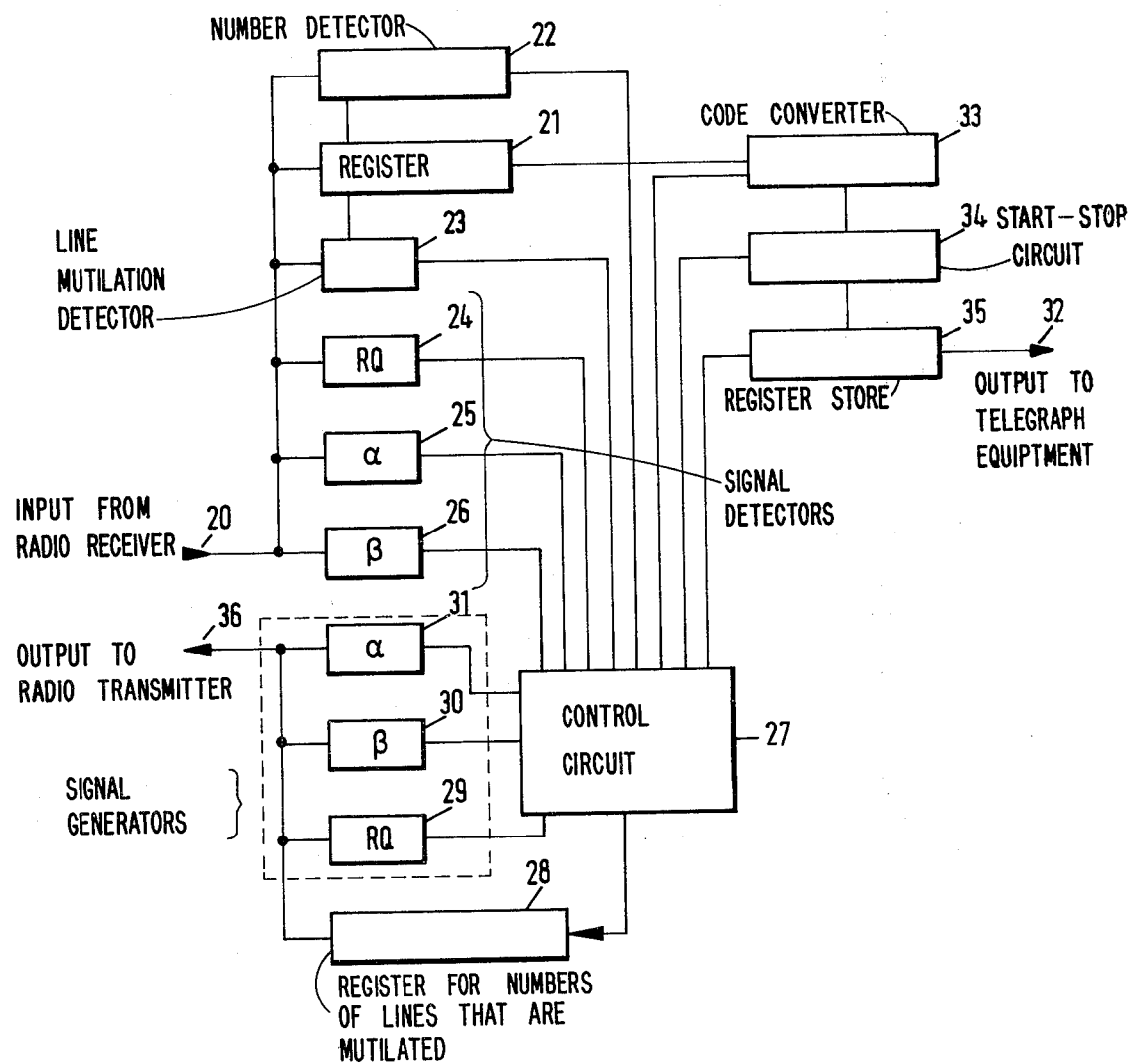
FIG. 4 represents a block wiring diagram of an embodiment of a receiver for receiving the signals sent by a transmitter according to FIG. 3.

FIG. 4 shows a block diagram of a receiver for operating the system according to the invention. The signal coming in at an input 20 (=output 10, FIG. 1) is stored in a register 21; a number detector 22 sees to it that the line number immediately following after the "carriage return"-signal is not stored in the register. A detector 23 checks each signal for parity and provides a line in the register 21 with a "1"-bit when all the signals in the relevant line have been received unmutilated and with a "0"-bit when one of the signals has been received mutilated. In addition there are an RQ-signal detector 24, an α-signal detector 25 and a β-signal detector 26.

A control circuit 27 sees to the coordination of the various circuits. Only the functions of this control circuit are defined in what follows; the embodiment is not essential. The control circuit can be realized in the form of a microprocessor and in the form of a combination of logic components. The transmitting part comprises a register 28 for storing the numbers of the lines received mutilated and moreover an α-signal generator 31, a β-signal generator 30 and an RQ-signal generator 29. For passing on the received and corrected information via an output 32 to the equipment which follows there are moreover a code converter 33 for converting the signal into a five-unit code as used for telex, a start-stop circuit 34 for adding start and stop codes to the converted signals and a register 35 for temporary storing telegraph signals, owing to which differences in speed, if any, between the receiver and the equipment which follows can be corrected.

Oscillator and synchronization circuits are not shown, but they are considered to be incorporated in the circuit in a generally known way.

The working of the circuit according to FIG. 4 will now be explained with the help of the time diagram according to FIG. 1.

As soon as the receiver R of station IRS alternately receives the signals α and RQ (FIG. 1, $t_1$), which are detected by the detectors 24 and 25, respectively, the β-signal generator 30 will be activated by the control circuit 27, and the β-signal will be transmitted a number of times (in the example five times) via a transmission line 36 (=line 14, FIG. 3). After the moment $t_4$ (FIG. 1) the "carriage return"-signal and after it the line number "0" are received and detected by the number detector 22. The traffic or message signals (C) received are stored in the register 21. On receipt of an error, which is detected by the error detector 23, the number of the line in which the error occurs is stored in the register 28 by the circuit 27. At the end of the information (FIG. 1, $t_6$) the α-signal detector 25 detects α-signals, and under the control of the circuit 27, the generator 29 transmits an RQ-signal, and the store 28 the numbers of the lines received mutilated and then again an RQ-signal (FIG. 1, $t_7$), all via the transmission line 36. The lines received repeated (FIG. 1, $t_9$) are now stored in the register 21 in place of corresponding lines received mutilated. As soon as all the mutilated received signals have been repeated and received unmutilated, and so after at most line 31, the contents of register 21 will be transferred to the register 35 under the control of the circuit 27, while at the same time, code conversion and the addition of start-stop bits is effected by the converter 33 and the circuit 34, respectively. The register 21 is now ready to receive the next lines. The transmitter and receiver as described are only given by way of example and therefore the invention is not at all restricted to the embodiments shown by FIGS. 3 and 4.

The embodiments of the transmitter and receiver as shown in FIGS. 3 and 4, respectively, can be modified in a simple way for operating according to the variant described with reference to FIG. 2.

While there is described above the principles of this invention in connection with specific apparatus, it is to be clearly understood that this description is made only by way of example and not as a limitation to the scope of this invention.

I claim:
1. In a radio teleprinter message communication system having remote transmitting and receiving stations, each station having a teleprinter, a transmitter-receiver, and an automatic error detection and correction device, the improvement comprising means to reduce the time spent in repetition of detected erroneous signals for systems having relatively long propagation times between stations, said means comprising:
   (A) means at each transmitting station for counting each line of a message transmitted from a teleprinter,
   (B) means at each transmitting station for comparing the current line count in said counting means with a predetermined line count limit corresponding to a page of lines, and for generating a page limit signal when the current line count equals the predetermined line count limit,
   (C) means at each transmitting station for assigning and transmitting identifying numbers associated with each line of a teleprinter message,
   (D) means at each transmitting station for storing at least twice the number of lines represented by said predetermined line count limit and their assigned numbers,
   (E) means at each receiving station for checking each said line received for errors,
   (F) means at each receiving station for storing the numbers assigned to said lines that were received with errors,
   (G) means at each receiving station for requesting repetition of just those lines that were received with errors by transmitting their assigned and stored numbers to that transmitting station that sent said erroneous lines,
   (H) means at that said transmitting station for interrupting the transmission of the message being transmitted upon the detection of a page limit signal and for repeating said erroneous lines requested to be repeated and which have not been previously repeated, upon the completion of which the counting means at that said transmitting station is reset and the transmission of the remainder of the message being transmitted is resumed, and
   (I) means at that said transmitting station for repeating said erroneous lines requested to be repeated and which have not been previously repeated upon the completion of the message being transmitted, upon the completion of which the counting means at that said transmitting station is reset in preparation for the start of the transmission of the next message.

2. A system according to claim 1 wherein each transmitting station includes means for generating and transmitting signals indicating the starting and ending of each said message, and means at each receiving station for receiving and detecting signals indicating the starting and ending of each said message.

3. A system according to claim 1 wherein each teleprinter generates a "carriage return" signal at the end of each line of a message, and that the line identifying number assigned to that line is transmitted immediately on receipt of said "carriage return" signal from the teleprinter at that transmitting station.

4. A system according to claim 1 wherein each teleprinter generates a "line feed" signal at the beginning of each line of a message, and that the line identifying number assigned to that line is transmitted immediately on receipt of said "line feed" signal from the teleprinter at that transmitting station.

* * * * *

UNITED STATES PATENT AND TRADEMARK OFFICE
CERTIFICATE OF CORRECTION

PATENT NO. : 4,432,090
DATED : February 14, 1984
INVENTOR(S) : Herman da Silva

It is certified that error appears in the above-identified patent and that said Letters Patent are hereby corrected as shown below:

Column 1, line 14, change "multilated" to - - mutilated - - .
Column 4, line 38, change "state" to - - contact position - - .
Column 4, line 39, change "contact position" to - - state - - .

Signed and Sealed this

Twenty-fourth Day of July 1984

[SEAL]

Attest:

GERALD J. MOSSINGHOFF

Attesting Officer  Commissioner of Patents and Trademarks